United States Patent [19]

Schneider et al.

[11] 4,138,005

[45] Feb. 6, 1979

[54] MECHANICAL PRESS DRIVE ARRANGEMENT

[75] Inventors: Franz Schneider; Eugen Waller, both of Goeppingen; Wolfram Büchler, Donzdorf; Heinz Weber, Waschenbeuren, all of Fed. Rep. of Germany

[73] Assignee: L. Schuler GmbH, Fed. Rep. of Germany

[21] Appl. No.: 777,158

[22] Filed: Mar. 11, 1977

[30] Foreign Application Priority Data

Mar. 13, 1976 [DE] Fed. Rep. of Germany ....... 2610692

[51] Int. Cl.² .............................................. B60K 41/24

[52] U.S. Cl. .............................. 192/12 C; 192/131 R; 100/53

[58] Field of Search ............... 192/12 C, 131 R, 18 A; 100/53

[56] References Cited

U.S. PATENT DOCUMENTS

| | | | |
|---|---|---|---|
| 2,854,115 | 9/1958 | Friedman | 192/12 C X |
| 3,084,676 | 4/1963 | Herion et al. | 192/12 C |
| 3,159,247 | 12/1974 | Charlton | 192/12 C |
| 3,216,541 | 11/1965 | Steffen | 192/12 C |
| 3,865,218 | 2/1975 | Jones, Jr. | 192/12 C |
| 3,881,582 | 5/1975 | Conway | 192/12 C |

*Primary Examiner*—James F. Coan
*Attorney, Agent, or Firm*—Craig & Antonelli

[57] ABSTRACT

A drive arrangement for a mechanically driven press with the press including at least one drive shaft mounted in a press frame and at least one eccentric or crank arranged on the drive shaft with a clutch being operatively connected to the drive shaft for permitting a press stroke operation upon engagement of the clutch. At least two hydraulic brakes are provided for braking the press between press strokes and a two system hydraulic circuit is provided for controlling the operation of the clutch and the at least two brakes.

18 Claims, 3 Drawing Figures

MECHANICAL PRESS DRIVE ARRANGEMENT

The present invention relates to presses and, more particularly, to a drive means for mechanical presses which include at least one drive shaft mounted in a press frame and at least one eccentric or a crank, whereby the drive shaft is non-positively connectable through a hydraulically actuated clutch with a drive or by way of brakes with the press frame.

Drive means for presses have been proposed, for example, in German Pat. Nos. 1,078,443 and 1,099,852, with each of these patents describing, in detail, clutches and brakes for presses with the clutches being hydraulically actuated and the brakes being of a design which has been traditional for generations in mechanical press constructions. The brake is raised by a pressure medium against the force of a spring and is thereby deactivated. During this operating condition, the clutch is usually engaged by the same pressure medium raising the brake. In order to stop the operation of the press, the supply of pressure medium to the press is interrupted so that the clutch is disengaged and the brake is activated by way of the spring force.

One disadvantage of constructions such as those proposed in the afore-mentioned German Patents resides in the fact that the braking torque is largely determined by the force of the springs so that relatively large brakes are necessary which exhibit a relatively sluggish response determined by the interval required for the pressure of a pressure medium to decrease.

A further drive system is proposed in U.S. Pat. Nos. 3,858,432, wherein a clutch is lifted by compressed air and a hydraulically actuated brake is utilized to stop the press. The hydraulic system is designed as a single circuit system and the press is constructed as a high speed press for continuous operation of about 1600 strokes per minute.

A disadvantage of the system proposed in the afore-mentioned United States Patent resides in the fact that the proposed hydraulic brake is not safe for presses which effect a single stroke of operation.

Moreover, in drive systems actuated by compressed air, not only is a considerable amount of noise generated by the shifting of the clutches and brakes, but also a relatively slow response time results.

The aim underlying the present invention essentially resides in providing a drive means for mechanical presses which includes actively actuated brakes.

According to one feature of the present invention, at least two brakes are provided, each of which can be applied by a pressure means.

One advantage of the present invention resides in the fact that the provision of at least two brakes results in the utilization of brakes which are relatively small components and have a small mass.

A further advantage of the present invention resides in the fact that the applied braking force can be set in a relatively simple manner by merely regulating the pressure of the pressure medium.

Moreover, according to the present invention, there is a considerable reduction of the reaction time from the application to the response of the brakes so that a greater braking distance is available, thereby permitting a "softer" braking and a reducing of stress on the corresponding parts of the press.

Furthermore, by the provision of brakes in accordance with the present invention, there is a marked reduction in the noise level during the operation of the mechanical press.

Accordingly, it is an object of the present invention to provide a drive means for a mechanical press which avoids by simple means the afore-mentioned shortcomings and drawbacks encountered in the prior art.

A further object of the present invention resides in providing a drive means for mechanical presses which overcomes a view relating to the use of such brakes which has been held in press constructions for decades.

Yet another object of the present invention resides in providing a drive means for mechanical presses which incorporates a hydraulic circuit as a two circuit system for mechanical presses used predominantly in a single stroke type of operation.

Another object of the present invention resides in providing a drive means for mechanical presses which is relatively simple in construction and therefor relatively inexpensive to manufacture.

A still further object of the present invention resides in providing a drive means for mechanical presses which operates reliably in all operating conditions of the press.

These and other objects, features, and advantages of the present invention will become more apparent from the following description when taken in connection with the accompanying drawings which show, for the purposes of illustration only, two embodiments in accordance with the present invention, and wherein.

Figure 1:
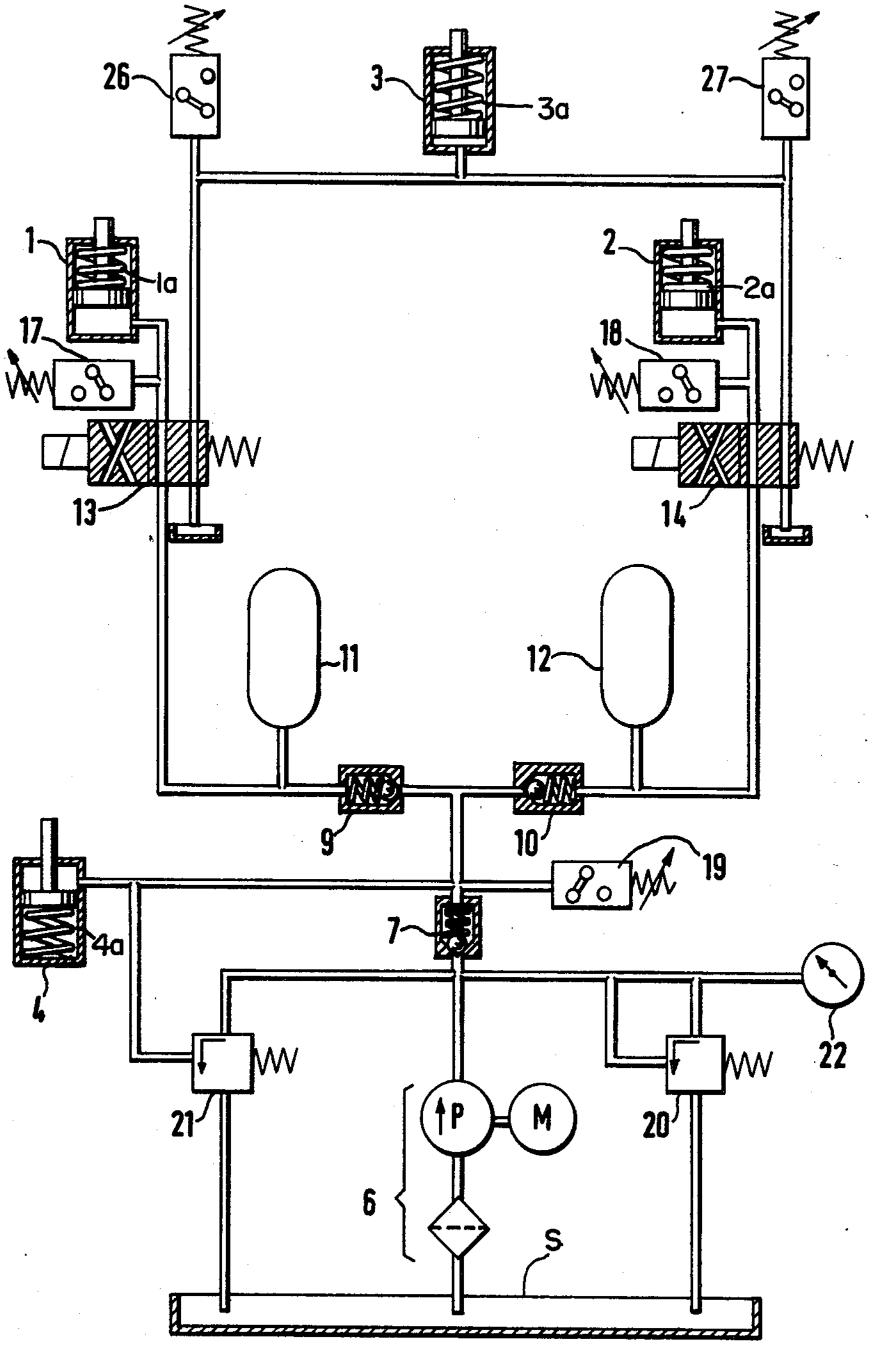
FIG. 1 is a schematic view of a hydraulic circuit of a drive means for a mechanical press with two simultaneously actuable hydraulic brakes in accordance with the present invention.

Referring now to the drawings, wherein like reference numerals are used in both views to designate like parts and, more particularly, to FIG. 1, according to this figure, the drive means is provided with brake actuators 1, 2 and a clutch actuator 3, each of which is schematically illustrated in the form of actuating elements such as, for example, cylinder-piston units. A holding brake 4, also schematically illustrated as a cylinder-piston unit, is actuated by a force of a spring 4*a* and released by the application of a pressure medium acting upon the cylinder-piston unit so as to urge the piston against the bias of the spring 4*a*.

The brake actuators 1, 2 and the clutch actuator 3 are each hydraulically actuated and are returned to their respective resting or inoperative positions by the forces of, for example, springs 1*a*, 2*a*, 3*a*.

The hydraulic circuit is a two circuit system and includes a pressure generator 6, consisting of a pump P driven by an electric motor M and a sump S, connected to pressure storage units 11, 12 by way of a check valve 7 and two additional check valves 9, 10. The holding brake 4 is connected to the pressure generator 6 at a position upstream of the check valve 7.

The pressure storage units 11, 12 are each connected by way of hydraulic lines with control valves 13, 14, with the control valve 13 connecting the pressure storage unit 11 with either the brake actuator 1 or clutch actuator 3 and the control valve 14 connecting the pressure storage unit 12 with the brake actuator 2 or with the clutch actuator 3. Pressure monitors 26, 27 are arranged in the hydraulic lines between the brake actuator 1, 2 and the clutch actuator 3.

A pressure monitor 17 is provided for the brake actuator 1 and communicates with the hydraulic line between the control valve 13 and the brake actuator 1, while a similar pressure monitor 18 is interposed between the control valve 14 and the brake actuator 2. A further pressure monitor 19 is connected beyond the check valve 7 and over-pressure valves 20, 21 are provided for protecting the pressure generator 6 directly and also for protecting the pressure storage units 11, 12 against a possible development of an over-pressure. A pressure gauge such as, for example, a manometer 22, is connected to the pressure generator 6 to provide an indication of the generated pressure.

Figure 3:
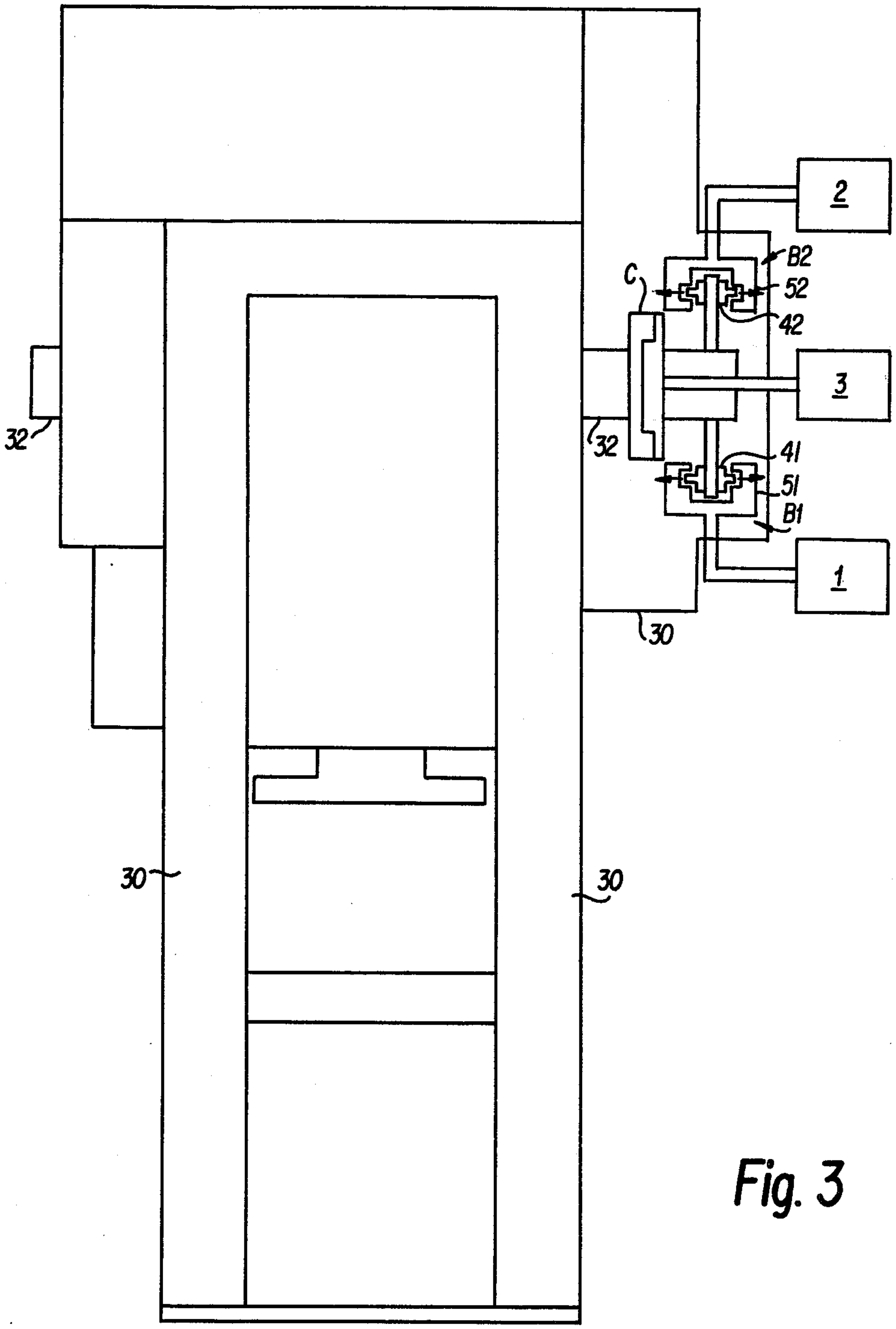
FIG. 3 is a schematic view of an eccentric press with a press frame.

In FIG. 3, there is schematically illustrated a mechanically driven press. The press includes at least one drive shaft 32 mounted in a press frame 30. Either an eccentric or a crank may be arranged on the drive shaft 32. A clutch C is operatively connected with the drive shaft 32 for permitting a press stroke operation upon engagement of the clutch C.

In operation, the pressure generator 6 supplies the pressure storage units through the hydraulic lines and check valves 7, 9, 10. The holding brake 4 is raised and the actuators 1, 2 are charged with a pressure medium. The clutch actuator 3 is separated from the pressure storage units 11, 12 and is disengaged so that the press stops.

If the press is to be re-started, for example, by a two-hand control, the control valves 13, 14 are turned or displaced so that the clutch C is engaged and the brakes generally designated by the reference characters B1, B2 are released. In a single stroke operation, the control valves 13, 14 are reversed or displaced to the position illustrated in FIG. 1, by conventional means, as a function of the crank angle at the end of the press stroke. Upon return of the control valves 13, 14, the clutch C is disengaged and the clutch actuator 3 is released from the application of pressure medium while the brakes B1, B2 are engaged and the brake actuators 1, 2 are simultaneously charged with pressure medium to stop the press.

The normal function of the drive means is continuously monitored by the pressure monitors 17, 18, 19, 26, 27 and the signals produced by the pressure monitors 17, 18, 19, 26 and 27 are fed to a central control unit (not shown) whereat the signals are evaluated in a known manner. Upon the ascertainment of a positive evaluation by the central control unit, the press can be re-started and, in this case, the signals from the pressure monitors 17, 18 evaluate the response of the brake actuators 1, 2 and therefor indicate that the braking torque has been transmitted to the brakes B1, B2 and then to the drive shaft 32. The signals from the pressure monitors 26, 27 indicate a normal condition of the parts of the hydraulic circuit between the control valves 13, 14.

The brakes B1, B2 can be constructed in a conventional manner as disk brakes 41, 42 which the calipers 51, 52 engage. The reactive force counteracting the braking force is determined as an indication of the transmitted braking torque.

Figure 2:
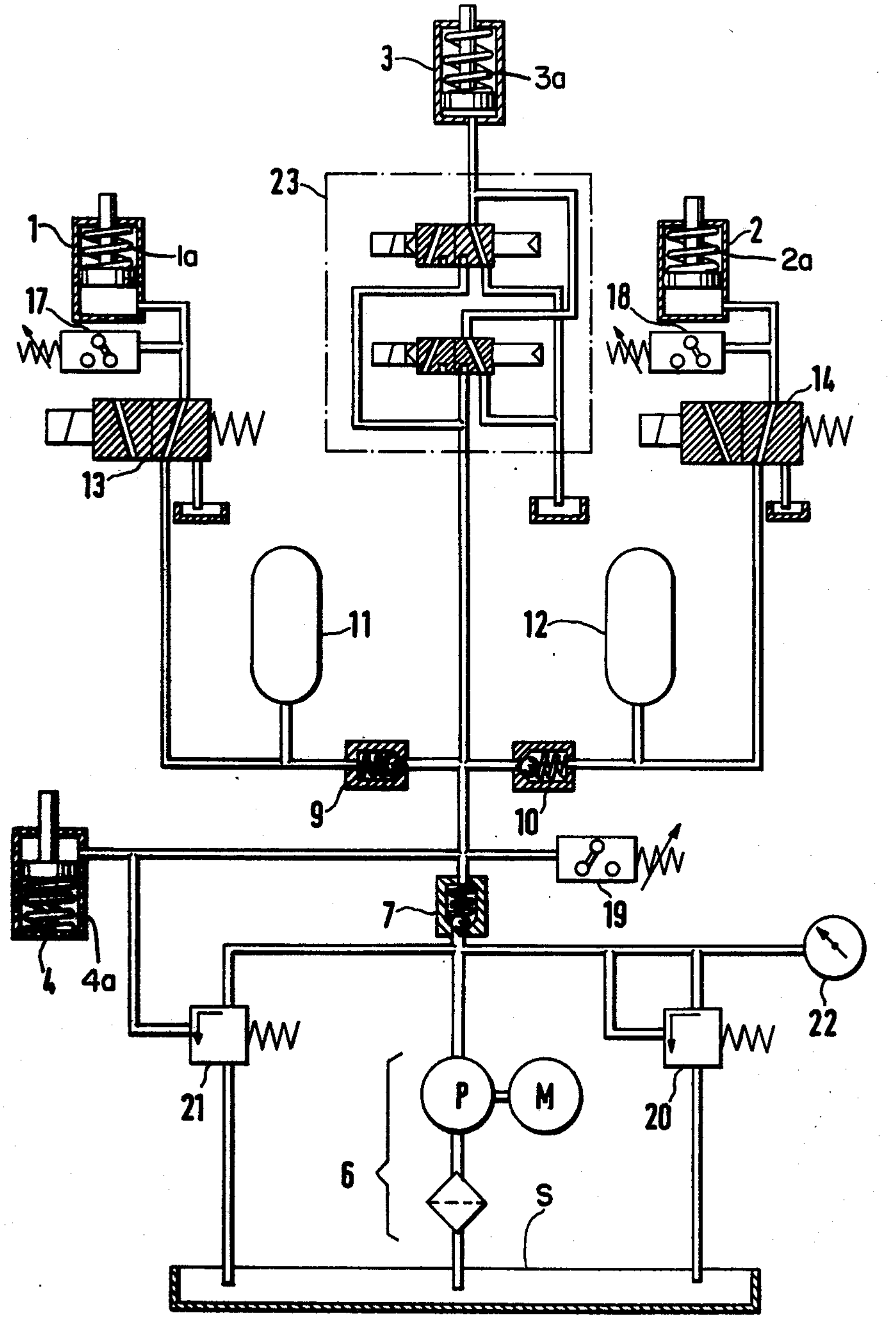
FIG. 2 is a schematic view of a hydraulic circuit of a drive means for a mechanical press having two independently actuable hydraulic brakes in accordance with the present invention.

In the afore-mentioned hydraulic system, the brakes B1, B2 are always actuated simultaneously; however, by the hydraulic system illustrated in FIG. 2, an operation is allowed in which the hydraulic brake actuator 1 is charged with a pressure medium to stop the press with the hydraulic brake actuator 2 being actuated separately when the press has stopped. At the next stroke of the press, the brake B2 would then stop the press and the brake B1 would be actuated by brake actuator 2 when the press has stopped so that only one of the brakes B1 or B2 is employed for stopping the press from one stroke to the next.

As shown in FIG. 2, the clutch actuator 3 is connected directly with the pressure generator 6 by a conventional press safety valve 23 and the check valve 7. To control the brake actuators 1, 2, the control valves 13 and 14 are actuated and it is not necessary to provide pressure monitors 26, 27 ahead of the valves 13, 14 as in the hydraulic circuit of FIG. 1.

Upon the occurrence of, for example, a failure of one of the brakes B1 or B2 or the brake actuators 1 or 2 to respond, as would be indicated by one of the pressure monitors 17, 18, the press could not be re-started since the control valves 13, 14 connect the pressure storage units 11, 12 with brake actuators 1 and 2 and can no longer be controlled. At the same time, the pressure generator 6 can be switched off so that the supply of pressure medium to the holding brake 4 is interrupted, whereby the spring biases the holding brake 44*a* to its operative position to apply the holding brake 4 and hold the stopped press.

If the press is to be shut down, in which case the pressure generator 6 would also be switched off, the holding brake 4 is activated by the biasing force of the spring 4*a* so as to secure the press and the press slide.

The brakes B1, B2, as noted above, may be constructed as disk brakes 41, 42 wherein one brake disk is permanently secured to the drive shaft 32 of the press with the calipers 51, 52 being mounted on the press frame 30. Each brake caliper would constitute a separate and independent brake, whereby more than two brakes can readily be provided by mounting the calipers symmetrically above the brake disk. See FIG. 3. Additionally, the brakes B1, B2 may be made self-adjusting in a conventional manner so as to ensure the application of a proper braking torque upon the actuation of the actuators 1, 2.

While we have shown and described only two embodiments in accordance with the present invention, it is understood that the same is not limited thereto, but is susceptible of numerous changes and modifications as known to one skilled in the art, and we therefor do not wish to be limited to the details shown and described herein, but intend to cover all such changes and modifications as are encompassed by the scope of the appended claims.

We claim:

1. A drive arrangement for a mechanically driven press, the press including at least one drive shaft mounted in a press frame, at least one of an eccentric and a crank being arranged on the drive shaft, and a clutch means operatively connected with the drive shaft for permitting a press stroke operation upon engagement thereof, the arrangement comprising:

at least two hydraulic brake means actively actuated into an operative position for braking the press between press strokes, and a hydraulic circuit means having at least two separate lines for controlling the operation of the clutch means and said at least two brake means.

2. An arrangement according to claim 1, further comprising at least one holding brake means for holding a stopped press, said holding brake means including a spring means for normally biasing said holding means into an operative position.

3. An arrangement according to claim 1, wherein said hydraulic circuit means includes at least two pressure medium storage means, each associated with one of at least two brake actuator means and with a clutch actuator means, and control valve means for alternately and independently activating said at least two brake actuator means and the clutch actuator means by supplying a pressure medium from the respective pressure medium storage means.

4. An arrangement according to claim 1, wherein said hydraulic circuit means includes a pressure generator means for generating a pressure in a pressure medium, means for directly communicating said pressure generator means with the clutch actuator means, a pressure safety valve means interposed between the pressure generator means and the clutch actuator means, a pressure medium storage means operatively associated with each of said at least two brake actuator means, and control valve means, being interposed between the pressure storage means and an associated brake actuator means, for causing separate and independent actuation of the associated brake actuator means.

5. An arrangement according to claim 4, further comprising at least one holding brake means for holding a stopped press, said holding brake means including a spring means for normally biasing said holding brake means into an operative position, and wherein said pressure generator means supplies a pressure medium to said holding brake means to cause the holding brake means to be displaced against the bias of said spring means so as to release a braking force thereof when the press is operating.

6. An arrangement according to claim 5, wherein check valve means are interposed between said pressure generator means and the respective pressure medium storage means.

7. An arrangement according to claim 5, wherein pressure monitor means are operatively associated with at least two brake actuator means and with said pressure generator means for monitoring and providing a signal indicative of an operating condition of said brake actuator means and the pressure generator means.

8. An arrangement according to claim 7, wherein said at least two brake means are constructed as disk brakes, each of which includes a brake disk and at least one brake caliper, said brake disk being fixedly secured to the drive shaft and said brake caliper being fixedly secured to the press frame.

9. An arrangement according to claim 8, wherein said brake calipers are symmetrically disposed about the brake disk.

10. An arrangement according to claim 1, wherein said hydraulic circuit means includes a pressure generator means for generating a pressure in a pressure medium, at least two pressure medium storage means, each associated with one of said at least two brake actuator means and with the clutch actuator means, and control valve means for simultaneously activating said at least two brake actuator means by supplying a pressure medium to the respective brake actuator means from the associated pressure medium storage means.

11. An arrangement according to claim 10, further comprising at least one holding brake means for holding a stopped press, said holding brake means including a spring means for normally biasing said holding means into an operative position.

12. An arrangement according to claim 10, further comprising at least one holding brake means for holding a stopped press, said holding brake means including a spring means for normally biasing said holding brake means into an operative position, and wherein said pressure generator means supplies a pressure medium to said holding brake means to cause the holding brake means to be displaced against the bias of said spring means so as to release a braking force thereof when the press is operating.

13. An arrangement according to claim 12, wherein check valve means are interposed between said pressure generator means and the respective pressure medium storage means.

14. An arrangement according to claim 13, wherein pressure monitor means are operatively associated with said at least two brake actuator means and the pressure generator means for monitoring and providing a signal indicative of an operating condition of said brake actuator means and the pressure generator means.

15. An arrangement according to claim 14, wherein said at least two brake means are constructed as disk brakes, each of which includes a brake disk and at least one brake caliper, said brake disk being fixedly secured to the drive shaft and said brake caliper being fixedly secured to the press frame.

16. An arrangement according to claim 15, wherein said brake calipers are symmetrically disposed about the brake disk.

17. An arrangement according to claim 1, wherein said at least two brake means are constructed as disk brakes, each of which includes a brake disk and at least one brake caliper, said brake disk being fixedly secured to the drive shaft and said brake caliper being fixedly secured to the press frame.

18. An arrangement according to claim 17, wherein said brake calipers are symmetrically disposed about the brake disk.

* * * * *